M. E. BEASLEY.
Roasting and Baking Pan.

No. 214,084. Patented April 8, 1879.

Witnesses:
A. P. Grant
H. F. Kircher

Inventor:
Maria E. Beasley,
by John A. Wiedersheim
ATTORNEY.

UNITED STATES PATENT OFFICE.

MARIA E. BEASLEY, OF PHILADELPHIA, PENNSYLVANIA.

IMPROVEMENT IN ROASTING AND BAKING PANS.

Specification forming part of Letters Patent No. 214,084, dated April 8, 1879; application filed September 26, 1878.

*To all whom it may concern:*

Be it known that I, MARIA E. BEASLEY, of city and county of Philadelphia, and State of Pennsylvania, have invented a new and useful Improvement in Roasting and Baking Pans, which improvement is fully set forth in the following specification and accompanying drawings, in which—

Figure 1:
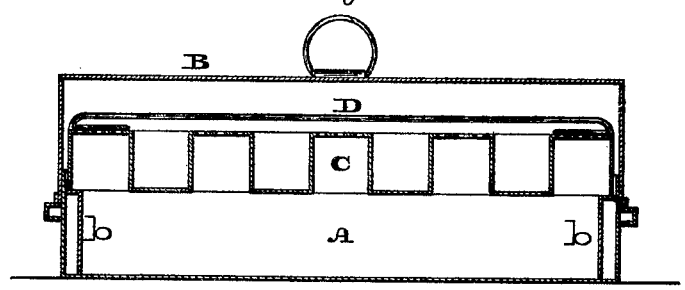
Figure 2:
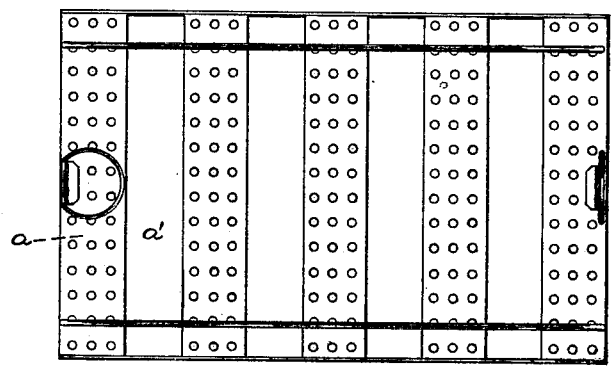
Figure 3:
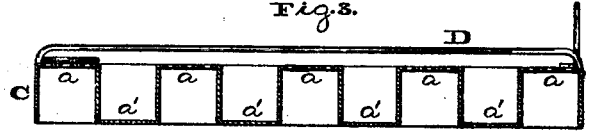
Figure 4:
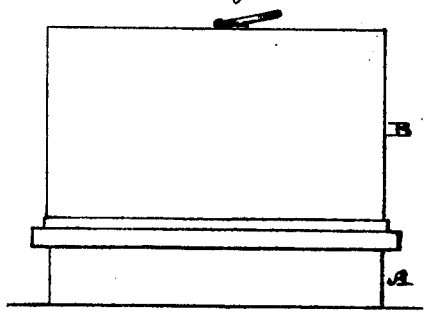

Figure 1 is a longitudinal vertical section of the pan embodying my invention. Fig. 2 is a top view of the interior thereof. Fig. 3 is a view of a portion of Fig. 1. Fig. 4 is a side view of the pan vertically enlarged.

Similar letters of reference indicate corresponding parts in the several figures.

My invention consists of a combined roasting or baking and steaming pan, the same being formed of a pan and lid with a false bottom, having faces alternately elevated and depressed, the elevated faces being perforated, and a rack adapted to support the meat or other article of food in an elevated position, whereby the under side of the food is subjected to jets of steam, while the top and other sides are exposed to the heat.

The elevated rack prevents clogging of the steam-jets and permits the steam to act forcibly against the food, and then expand under the entire lower surface thereof.

The false bottom is formed of sheet metal, struck up into alternate elevated and depressed faces, and the elevated faces are perforated, so as to provide jets, whereby the steam will be injected against the under side of the meat, &c.

Referring to the drawings, A represents a pan, and B the lid thereof. C represents a false bottom, which is formed of faces $a$ $a'$, alternately elevated and depressed, and rested on ledges $b$ $b$ of the pan A.

The elevated faces $a$ are perforated, and, if desired, tubes may be employed in lieu of the perforations. Pieces D are secured to the bottom C and elevated therefrom, so as to form a rack, on which the food is supported.

Water is placed in the pan A, and as the steam is formed it rises, and, passing through the perforations of the faces $a$ $a'$, is directed against the under face of the article of food, which also is subjected to heat on its top and sides, whereby the combined action of steam and heat cooks and roasts or bakes said article, so that it is quickly done, and it becomes tender and juicy, as in the case of meat, even if tough in a raw state.

The depressed faces $a'$, with longitudinal side pieces of the bottom, form receptacles for the drippings, which, heated by water in the pan A, will not dry materially or burn, and provision is made for readily collecting the same.

The steam, directed by the numerous jets or perforations of the elevated faces $a$, is injected forcibly and effectively against the under side of the elevated piece of meat, &c., and it then expands so that the entire under side is subjected to the action of steam, the advantages whereof are evident.

The false bottom is formed of sheet metal struck up into the shape described, so as to be cheap, light, and easily handled; and as the elevated and depressed faces are of the nature of corrugations, said bottom is stiffened and thereby well enabled to endure the weight imposed on it; but it may also be formed of cast metal.

I am aware that it is not new to form a cast-iron pan or griddle of a series of cups, having intermediate spaces and adapted for steaming the articles placed in the cups; but such device is not my invention, and I hereby disclaim the same.

Having thus described my invention, what I claim as new, and desire to secure by Letters Patent, is—

The combined roasting or baking and steaming pan, the same consisting of the pan A and lid B, and the false bottom C, formed of the perforated elevated faces $a$ and depressed faces $a'$, and provided with the rack D, substantially as and for the purpose set forth.

MARIA E. BEASLEY.

Witnesses:
JOHN A. WIEDERSHEIM,
CHAS. O. BEASLEY.